United States Patent
Pyecroft et al.

(10) Patent No.: US 7,001,872 B2
(45) Date of Patent: Feb. 21, 2006

(54) SUBTERRANEAN FORMATION TREATING FLUID AND METHODS OF FRACTURING SUBTERRANEAN FORMATIONS

(75) Inventors: James Frederick Pyecroft, Carrollton, TX (US); Jim D. Weaver, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 298 days.

(21) Appl. No.: 10/623,438

(22) Filed: Jul. 18, 2003

(65) Prior Publication Data

US 2004/0018943 A1  Jan. 29, 2004

Related U.S. Application Data

(60) Continuation-in-part of application No. 10/254,268, filed on Sep. 25, 2002, which is a division of application No. 09/879,634, filed on Jun. 11, 2001, now Pat. No. 6,488,091.

(51) Int. Cl.
E21B 43/26 (2006.01)
C09K 3/00 (2006.01)

(52) U.S. Cl. ............... 507/211; 507/215; 507/216; 507/217; 507/922; 507/903; 166/308.5

(58) Field of Classification Search ............... 507/211, 507/215, 216, 217, 922, 903; 166/308.5
See application file for complete search history.

(56) References Cited

U.S. PATENT DOCUMENTS

| | | | |
|---|---|---|---|
| 2,782,190 A | 2/1957 | Fischer et al. | 507/510 |
| 3,480,511 A | 11/1969 | Jones | 195/31 |
| 3,728,331 A | 4/1973 | Savage | 260/231 R |
| 3,794,115 A | 2/1974 | Skagerberg | 166/294 |
| 4,061,859 A | 12/1977 | Cheng | 536/88 |
| 4,078,610 A | 3/1978 | Arnold | 166/280 |
| 4,568,481 A | 2/1986 | Harris, Jr. | 252/315.3 |
| 4,753,659 A | 6/1988 | Bayerlein et al. | 8/561 |
| 4,766,959 A * | 8/1988 | Allison | 166/295 |
| 4,828,726 A | 5/1989 | Himes et al. | 252/8.553 |
| 4,874,854 A | 10/1989 | Colegrove et al. | 536/114 |
| 4,974,678 A | 12/1990 | Himes et al. | 166/308 |
| 4,977,962 A | 12/1990 | Himes et al. | 166/305 |
| 5,009,797 A | 4/1991 | Penny et al. | 252/8.551 |
| 5,097,904 A | 3/1992 | Himes | 166/294 |
| 5,184,680 A | 2/1993 | Totten et al. | 166/293 |
| 5,197,544 A | 3/1993 | Himes | 166/294 |
| 5,305,832 A | 4/1994 | Gupta et al. | 166/300 |
| 5,330,005 A | 7/1994 | Card et al. | 166/280 |
| 5,350,528 A | 9/1994 | Westland et al. | 252/8.551 |
| 5,439,055 A | 8/1995 | Card et al. | 166/280 |
| 5,501,275 A | 3/1996 | Card et al. | 166/280 |
| 5,658,861 A | 8/1997 | Nelson et al. | 507/200 |
| 5,697,444 A | 12/1997 | Moorhouse et al. | 166/308 |
| 5,708,162 A | 1/1998 | Hilbig et al. | 536/124 |
| 5,720,347 A | 2/1998 | Audibert et al. | 166/294 |
| 5,728,564 A | 3/1998 | Sambrook et al. | 435/215 |
| 5,775,415 A | 7/1998 | Yoshimi et al. | 165/202 |
| 5,775,425 A | 7/1998 | Weaver et al. | 166/276 |
| 5,787,986 A | 8/1998 | Weaver et al. | 166/280 |
| 5,833,000 A | 11/1998 | Weaver et al. | 166/276 |
| 5,839,510 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,948,848 A | 9/1999 | Giltsoff | 524/503 |
| 6,017,855 A | 1/2000 | Dawson et al. | 507/209 |
| 6,047,772 A | 4/2000 | Weaver et al. | 166/276 |
| 6,383,990 B1 | 5/2002 | Dawson et al. | 507/209 |
| 6,488,091 B1 | 12/2002 | Weaver et al. | 166/300 |
| 2003/0045708 A1 | 3/2003 | Magallanes et al. | 536/123 |
| 2004/0163813 A1 * | 8/2004 | Slabaugh et al. | 166/294 |
| 2005/0059555 A1 * | 3/2005 | Dusterhoft et al. | 507/100 |
| 2005/0059558 A1 * | 3/2005 | Blauch et al. | 507/203 |

FOREIGN PATENT DOCUMENTS

| EP | 0 030 443 A1 | 6/1981 |
|---|---|---|
| EP | 0343294 A1 | 11/1989 |
| WO | WO 93/15116 | 8/1993 |
| WO | WO 9634179 | 10/1996 |
| WO | WO 00/26280 | 5/2000 |

OTHER PUBLICATIONS

Billingham, N. C., *Characterization of High Polymers by Gel Permeation Chromatography*, Chapter 10, 1976, from *Practical High Performance Liquid Chromatography*, pp. 167-191, Simpson, C. F., Editor.

Craig, David, et al, *The Degradation of Hydroxypropyl, Guar Fracturing Fluids by Enzyme, Oxidative, and Catalyzed Oxidative Breakers*, 1992, Southwestern Petroleum Short Course—92, Apr. 22-23, pp. 1-19.

Frollini, E., et al, *Polyelectrolytes from polysaccharides: selective oxidation of guar gum—a revisited reaction*, 1995, *Carbohydrate Polymers*, 27, pp. 129-135.

(Continued)

*Primary Examiner*—Philip C. Tucker
(74) *Attorney, Agent, or Firm*—Robert A. Kent; Baker Botts

(57) ABSTRACT

The present invention relates to methods and compositions for treating subterranean well formations, and more specifically, to improved subterranean formation treating fluid concentrates, treating fluids and methods of using such treating fluids in subterranean formations. The treating fluid concentrates generally comprise water and a substantially fully hydrated depolymerized polymer. The treating fluids which are formed by adding water to the treating fluid concentrates generally comprise water, a substantially fully hydrated depolymerized polymer and a crosslinking agent for crosslinking the hydrated depolymerized polymer.

34 Claims, No Drawings

OTHER PUBLICATIONS

Ouchi, T., et al, *Synthesis and Cytotoxic Activity of Acidized Galactomannan/ADR Conjugate*, 1997, *J.M.S.—Pure Appl. Chem.*, A34(6), pp. 975-989.

Schultz, Donald N., et al, Editors by Glass, J. Edward, et al, *Polymers as Rheology Modifiers, An Overview*, 1991, American Chemical Society, ACS Symposium Series 462, Chapter 1, pp. 1-7.

Tayal, Akash., et al, *Degradation of a Water-Soluble Polymer: Molecular Weight Changes and Chain Scission Characteristics*, 2000, American Chemical Society, *Macromolecules 2000*, 33, pp. 9488-9493.

Vijayendran, B. R., et al, *Absolute Molecular Weight and Molecular Weight Distribution of Guar by Size Exclusion Chromatography and Low-angle Laser Light Scattering*, 1984, *Carbohydrate Polymers 4*, pp. 299-313.

* cited by examiner

SUBTERRANEAN FORMATION TREATING FLUID AND METHODS OF FRACTURING SUBTERRANEAN FORMATIONS

CROSS-REFERENCE TO RELATED APPLICATION

This Application is a Continuation-in-Part of U.S. application Ser. No. 10/254,268 entitled "Subterranean Formation Treating Fluid Concentrates, Treating Fluids and Methods, filed on Sep. 25, 2002, which is a divisional of Ser. No. 09/879,634 filed Jun. 11, 2001 entitled "Subterranean Formation Treating Fluid Concentrates, Treating Fluids and Methods," now U.S. Pat. No. 6,488,091.

BACKGROUND OF THE INVENTION

1. Field of the Invention

The present invention relates to methods and compositions for treating subterranean well formations, and more specifically, to improved subterranean formation treating fluid concentrates, treating fluids and methods of using such treating fluids in subterranean formations.

2. Description of Related Art

Producing subterranean formations penetrated by well bores are often treated to increase the permeabilities or conductivities thereof. One such production stimulation treatment involves fracturing the formation utilizing a viscous treating fluid. That is, the subterranean formation or producing zone therein is hydraulically fractured whereby one or more cracks or "fractures" are produced therein. Fracturing may be carried out in wells that are completed in subterranean formations for virtually any purpose. The usual candidates for fracturing or other stimulation procedures are production wells completed in oil and/or gas containing formations. However, injection wells used in secondary or tertiary recovery operations for the injection of fluids may also be fractured in order to facilitate the injection of fluids.

Hydraulic fracturing may be accomplished by injecting a viscous fracturing fluid into a subterranean formation or zone at a rate and pressure sufficient to enhance or create one or more fractures in a desired location within the formation. As the fracture is created a portion of the fluid contained in the viscous fracturing fluid leaks off into the permeable formation and a filter cake comprised of deposited gelling agent may be built up upon the walls of the fracture which then helps to prevent or reduce further fluid loss from the fracturing fluid to the formation. The continued pumping of the viscous fracturing fluid extends the fractures. Proppant such as sand or other particulate material may be suspended in the fracturing fluid and introduced into the created fractures. The proppant material functions to prevent the formed fractures from closing upon reduction of the hydraulic pressure, which was applied to create the fracture in the formation or zone whereby conductive channels remain through which produced fluids can readily flow to the well bore upon completion of the fracturing treatment.

The fracturing fluid should have a sufficiently high viscosity to retain the proppant material in suspension as the fracturing fluid flows into the created fractures. A viscosifier has heretofore often been utilized to increase the viscosity of a base fluid. After the viscosified fracturing fluid has been pumped into the formation and fracturing of the formation has occurred, the fracturing fluid generally has been caused to revert into a low viscosity fluid for removal from the formation by breaking the gel. The breaking of viscosified fracturing fluids has commonly been accomplished by utilizing a breaker with the fracturing fluid.

The fracturing fluids utilized heretofore have predominantly been water-based liquids containing a gelling agent comprised of a polysaccharide such as guar gum. Guar and derivatized guar polymers such as hydroxypropylguar are water soluble polymers that may be used to create high viscosity in an aqueous fluid and may be readily crosslinked to further increases the viscosity of the fluid. While the use of gelled and crosslinked polysaccharide fracturing fluids has been highly successful, such fracturing fluids have not been thermally stable at temperatures above about 200° F. That is, the highly viscous gelled and crosslinked fluids may lose viscosity with time at high temperatures. To offset the loss of viscosity, the concentration of the gelling agent may be increased, which results in, inter alia, increased costs and increased friction pressure in the tubing through which the fluid is injected into a subterranean formation which makes pumping of the fracturing fluids more difficult. Thermal stabilizers such as sodium thiosulfate have been included in the fracturing fluids to scavenge oxygen and thereby increase the stabilities of the fracturing fluids at high temperatures. However, the use of thermal stabilizers may also increase the cost of the fracturing fluids.

Another problem which has been experienced in the use of gelled and crosslinked polysaccharide fracturing fluids involves the breaking of such fracturing fluids after fractures have been formed. Breakers such as oxidizers, enzymes and acid release agents that attack the polymer backbone have been used successfully.

In order to make the heretofore used gelled and crosslinked polysaccharide fracturing fluids carry sufficient proppant, the concentration of the crosslinking agent utilized has often had to be increased which in turn increases the cost and viscosity of the fracturing fluid. The water based fracturing fluids including gelled and crosslinked polysaccharide gelling agents have had significantly reduced fluid loss as compared to other fracturing fluids which reduces or eliminates the need for costly fluid loss additives. However, because the gelled and crosslinked polysaccharides have had high molecular weights, the filter cake produced from the viscous fracturing fluid on the walls of well bores penetrating producing formations and in fractures formed therein is often very difficult to remove.

Another problem experienced in the use of a water based fracturing fluid including a gelled and crosslinked polysaccharide gelling agent is that it often must be mixed in holding tanks for a considerable length of time for hydration of the gelling agent to occur. During the fracturing process carried out in a well, the hydrated fracturing fluid generally is pumped out of the holding tanks, mixed with proppant and other additives on the fly and pumped down the well bore to the formation being fractured. If during the job, the down hole pressure profile and other parameters that are obtained in real time indicate that a change in the fracturing fluid properties is required, that is, a change in the fracturing fluid viscosity to prevent a screen out of the fracture or the like, it is generally risky to do so since it takes a very long time for a change to be made and for the changed fracturing fluid to reach the formation being fractured. Another problem related to pumping the fracturing fluid from holding tanks and combining the proppant material, crosslinker and other additives used on the fly is that the procedure requires the use of expensive metering and other similar equipment.

Additionally, in many environmentally sensitive areas, the water based fracturing fluids containing polysaccharide gelling agents must be recovered from the well and disposed of by environmentally appropriate means which increases the overall cost of the fracturing treatment.

Certain types of subterranean formations, such as certain types of shales and coals have been observed to respond unfavorably to fracturing with conventional fracturing fluids. For example, in addition to opening a main, dominant fracture, the fracturing fluid may further invade numerous natural fractures (or "butts" and "cleats," where the formation comprises coal) intersecting the main fracture, thereby permitting conventional gelling agents within the fracturing fluid to invade such intersecting natural fractures. When these openings re-close at the conclusion of fracturing, the conventional gelling agent may become trapped therein, which, inter alia, may inhibit the production of hydrocarbons from the natural fractures to the main fracture. Further, even in circumstances where the gelling agent does not become trapped within the natural fractures, a thin coating of the gel may nevertheless remain on the surface of the natural fractures after the conclusion of the fracturing operation. This may be problematic, inter alia, where the production of hydrocarbons from the subterranean formation involves processes such as desorption of the hydrocarbon from the surface of the formation, rather than production of hydrocarbons stored in interconnected pore spaces such as those found in conventional oil and gas reservoirs. Previous attempts to solve these problems have involved the use of less viscous fracturing fluids, such as non-gelled water. However, this is problematic, inter alia, because such fluids may prematurely dilate natural fractures perpendicular to the main fracture—a problem referred to as "near well bore fracture complexity," or "near well bore tortuosity." This is problematic because the creation of multiple fractures, as opposed to one or a few dominant fractures, results in reduced penetration into the formation, i.e., for a given injection rate, many short fractures are created rather than one or a few lengthy ones. This is problematic because in low permeability formations, the driving factor to increase productivity is the fracture length. Furthermore, the use of less viscous fracturing fluids has typically also required excessive fluid volumes and/or excessive injection pressure. The excessive entry pressure may frustrate attempts to place proppant into the fracture, causing the fracturing operation to fail in its attempt to increase hydrocarbon production.

SUMMARY OF THE INVENTION

The present invention relates to methods and compositions for treating subterranean well formations, and more specifically, to improved subterranean formation treating fluid concentrates, treating fluids and methods of using such treating fluids in subterranean formations.

An example of a method of the present invention is a method of fracturing a subterranean formation comprising the steps of: introducing a first treating fluid into the subterranean formation at or near a zone of interest to create or enhance at least one fracture therein, the first treating fluid being a gelled and crosslinked treating fluid comprising water, a substantially fully hydrated depolymerized polymer and a crosslinking agent for crosslinking the substantially hydrated depolymerized polymer; introducing a second treating fluid into the subterranean formation such that a length of at least one fracture therein is extended, the second treating fluid having a lower viscosity than the first treating fluid; and introducing a third treating fluid into the subterranean formation, the third treating fluid being a gelled and crosslinked treating fluid comprising water, a substantially fully hydrated depolymerized polymer and a crosslinking agent for crosslinking the substantially hydrated depolymerized polymer, and further comprising a proppant material.

The objects, features and advantages of the present invention will be readily apparent to those skilled in the art upon a reading of the description of the preferred embodiments which follows.

DESCRIPTION OF PREFERRED EMBODIMENTS

The present invention relates to methods and compositions for treating subterranean well formations, and more specifically, to improved subterranean formation treating fluid concentrates, treating fluids and methods of using such treating fluids in subterranean formations.

As mentioned above, the present invention provides an improved subterranean formation treating fluid which in certain embodiments may be prepared on the job site in a very rapid manner from a substantially fully hydrated subterranean formation treating fluid concentrate. The treating fluid concentrate may be produced at an off-site manufacturing location and can be stored for long periods of time prior to or after being transported to the job site. The improved subterranean formation treating fluid is prepared at the job site by simply mixing the substantially fully hydrated treating fluid concentrate with additional water and any desired additives not already contained in the concentrate. The preparation of the treating fluid involves the steps of metering the treating fluid concentrate into a blender wherein it is mixed with the additional water and additives which also may be metered into the blender or otherwise added to the fluid. The mixture may then be substantially simultaneously pumped out of the blender and into the subterranean formation to be treated by way of a well bore penetrating it. In such a method, the time lapse from when the metering, mixing and pumping process starts to when the treating fluid reaches the subterranean formation may be only a few minutes. This allows changes in the properties of the treating fluid to be made on the surface as required during the time the treating fluid is being pumped. For example, in a fracturing procedure carried out in a subterranean formation to stimulate production from the subterranean formation, changes can be made to the fracturing fluid during the pumping of the fluid in response to continuously monitored down hole parameters to achieve desired fracturing results, that is, the viscosity of the fracturing fluid, the amount of proppant material carried by the fracturing fluid and other properties of the fracturing fluid can be continuously measured on the surface and changed as required to achieve optimum down hole treatment results in real time.

The subterranean formation treating fluid concentrate of this invention generally comprises water and a substantially fully hydrated depolymerized polymer.

The substantially fully hydrated depolymerized polymer may be manufactured by any method known in the art. In one such method, the polymer may be manufactured by forming a hydratable polymer having a relatively high molecular weight as a result of derivatization of a polysaccharide and then subjecting it to extensive depolymerization whereby the polymer backbone is divided into short chain polymer segments. The manufacture of such polymers can be made by derivatization and depolymerization techniques known in the art or as described in United States Application entitled "Galactomannan Compositions and Methods for Making and Using the Same," filed Jun. 11, 2001 (Jesse Magallanes, Sylvain Diguet, William Stivers)(hereinafter referred to as the Magallanes application). In one embodiment, the depolymerized polymer of the present invention may be prepared by adding the polymer to be depolymerized to a reactor vessel together with a quantity of hydrogen peroxide and water. In a preferred embodiment, the depolymerized polymer is prepared by the methods described in the Magallanes application, the relevant disclosure of which is incorporated herein by reference. The reactor vessel may be heated to an elevated temperature such as about 100° F. to initiate the reaction if the ambient temperature is insufficient to initiate the reaction. Once initiated, the depolymerization reaction is exothermic and the temperature of the reactor vessel generally should be maintained in the range of from about 100–200° F. for a sufficient time for the polymer to degrade to the desired molecular weight. Alternatively, the polymer may be formed from lower molecular weight monomers that are polymerized until a desired molecular weight is achieved. The hydratable polymer utilized for forming the short chain segments can be substantially any polysaccharide. In certain preferred embodiments, the hydratable polymer is a guar derivative polymer selected from the group consisting of hydroxypropylguar, carboxymethylhydroxypropylguar, carboxymethylguar, hydroxyethyl cellulose, hydroxyethyl cellulose grafted with glycidol or vinyl phosphonic acid, carboxymethyl cellulose, carboxymethylhydroxyethyl cellulose and the like. Of these, depolymerized hydroxypropylguar is preferred. Generally, the depolymerized polymer has an average molecular weight in the range of from about 25,000 to about 400,000. In certain preferred embodiments, the depolymerized polymer has an average molecular weight in the range of from about 100,000 to about 250,000. In certain preferred embodiments, the depolymerized polymer has a polydispersity ratio of from 1 to about 12 as determined by gel permeation chromatography as disclosed in "Practical High Performance Liquid Chromatography" edited by C. F. Simpson (Hyden & Son Ltd., 1976). The polydispersity ratio of polysaccharides or other polymers generally can range from about 2 to as much as 250. The depolymerized polymer of the present invention has been found to exhibit the superior properties identified herein when maintained within the indicated polydispersity ratio. If desired for purposes of transportation, storage or otherwise, the depolymerized polymer may be stored in dry form and, when needed, can be rehydrated to form the treating fluid concentrate. The substantially fully hydrated depolymerized polymer is admixed with the water in an amount in excess of about 6% by weight of the concentrate to form the treating fluid concentrate. Preferably, the polymer is present in an amount of from about 6% to about 30% by weight and most preferably from about 6% to about 20% by weight of the concentrate. The viscosity of the treating fluid concentrate generally may be in the range of from about 15,000 to in excess of about 35,000 cps as determined with a Brookfield DV II+RV spring viscometer manufactured by Brookfield Engineering Laboratories of Middleboro, Mass. The viscosity is determined by measurements performed at a temperature of about 75° F. and a rotational speed of 20 rpm using an LV3 bob. Other similar instruments may also be used to measure the viscosity of the fluid concentrate.

The water utilized to form the treating fluid concentrate can be fresh water, unsaturated salt water or saturated salt water. Generally, the substantially fully hydrated depolymerized polymer utilized in the present invention is mixed with the water in an amount in the range of from about 6% to about 30% by weight of the water.

In some instances it may be desirable to add a dispersing agent to the polymer for dispersing the depolymerized hydratable polymer, for example when it has been stored in a dry form and facilitating its rehydration in water. Any known dispersing agent may be used. A particularly suitable dispersing agent has been found to be a light hydrocarbon oil such as diesel oil, kerosene, olefins or the like. In certain other embodiments, the dispersing agent is polyethyleneglycol. In certain preferred embodiments, the dispersing agent is diesel oil. When an oil dispersing agent is utilized, it is generally included with the polymer in an amount in the range of from about 5% to about 60% by weight of the polymer.

A variety of other additives can be included in a concentrate of this invention at the time of its manufacture. Such additives generally include pH adjusting compounds for adjusting the pH of the treating fluid to an optimum or desired pH for crosslinking when it is formed with the concentrate. Examples of such compounds that may be utilized include, but are not limited to, formic acid, fumaric acid, acetic acid, acetic anhydride, hydrochloric acid, sodium hydroxide, potassium hydroxide, lithium hydroxide, various carbonates or any other commonly used pH control agent that does not adversely react with the polymer to prevent its use in accordance with the method of the present invention. Of these, sodium hydroxide is preferred. When used, the pH adjusting compound is generally present in the concentrate in an amount in the range of from about 0.5% to about 10% by weight of the water therein.

A pH buffer also can be included in the concentrate. Examples of buffers that may be used include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate and the like. When used, the buffer is generally present in the concentrate in an amount in the range of from about 0.5% to about 10% by weight of the water therein. The amount of buffer used will depend on the desired pH change. One of ordinary skill in the art with the benefit of this disclosure will recognize the appropriate amount of buffer to include to achieve a desired pH change.

Another additive that may be included in the concentrate is a surfactant for preventing the formation of emulsions between the treating fluid which is formed with the concentrate and subterranean formation fluids. Examples of surfactants that may be used include, but are not limited to, alkyl sulfonates, alkyl aryl sulfonates including alkyl benzyl sulfonates such as salts of dodecylbenzene sulfonic acid, alkyl trimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols, trialkyl benzylammonium chloride and the like. Of these, salts of dodecylbenzene sulfonic acids are preferred. When used, the surfactant is generally present in the concentrate in an amount in the range of from about 0.01% to about 1% by weight of the water in the treatment fluid. Substantially any other surfactant that is known to be suitable for use in the treatment of subterranean formations and which does not adversely react with the fluid of the present invention may be utilized.

Yet another additive that may be included in the concentrate is a clay stabilizer. Examples of clay stabilizers that may be used include, but are not limited to, potassium chloride, sodium chloride, ammonium chloride and tetramethyl ammonium chloride and the like. Examples of some temporary clay stabilizers that are suitable for use in the present invention are disclosed in, for example, U.S. Pat. Nos. 5,197,544; 5,097904; 4,977,962; 4,974,678; and 4,828,726, the relevant disclosures of which are incorporated herein by reference. Of these, potassium chloride and tetramethyl ammonium chloride are preferred. When used, the clay stabilizer is generally present in the concentrate in an amount in the range of from about 2% to about 20% by weight of the water therein.

When the concentrate of this invention is mixed with additional water and any other desired additives to form a subterranean treating fluid, no hydration time is required as the concentrate is already substantially fully hydrated. The additional water is generally mixed with the concentrate in a water to concentrate ratio in the range of from about 4:1 to about 20:1 depending upon, inter alia, the final viscosity desired in the treating fluid. The water utilized can be fresh water, unsaturated salt water including brines or seawater, or saturated salt water.

A crosslinking agent may be mixed with the water and concentrate, in order to, inter alia, increase the viscosity of the treating fluid formed with the concentrate. The crosslinked short chain segments of the substantially fully hydrated depolymerized polymer in the concentrate may be crosslinked by the crosslinking agent thereby producing a viscous treating fluid having unexpected properties, such as the following: (1) The treating fluid including the extensively depolymerized hydrated and crosslinked polymer segments has unexpected thermal stability at temperatures above about 200° F. and preferably from about 200 to about 275° F. without the use of gel stabilizers. (2) The crosslinked treating fluids of the present invention produce filter cake containing low molecular weight polymer segments which have been discovered to ease removal of the filter cake at a desired time. (3) As prehydration of the treating fluids of the present invention is unnecessary, the treating fluid may rapidly be mixed with additional water and additives on the surface, thereby facilitating the execution of real time changes in the properties of the treating fluid as it is being pumped. (4) The treating fluids of the present invention produce very little residue when their viscosity is reduced. The treating fluid concentrate utilized in accordance with this invention is processed during its manufacture to remove residue from the concentrate. As a result, the low residue producing treating fluids of this invention produce fractures having higher conductivities than the heretofore used treating fluids. (5) As will be described further hereinbelow, the treating fluids of this invention can, when certain polymers and crosslinkers are employed, include acid reversible crosslink sites. When certain crosslinkers are utilized, the crosslinks are broken simply by lowering the pH to a level below about 9. In this pH range, the treating fluid is not crosslinked and yet the acetal linkages which form the crosslinking sites are stable and can be recrosslinked. This feature allows the treating fluid to be recovered from a treated subterranean formation and well bore and reused, rather than necessitating disposal of the fluid in environmentally sensitive locations. The recovery and reuse of the treating fluids of this invention makes them much more economical to use than conventional prior art fluids.

The improved subterranean formation treating fluids of this invention are basically comprised of water, a substantially fully hydrated depolymerized polymer and a crosslinking agent for crosslinking the hydrated depolymerized polymer. The water may be selected from fresh water, unsaturated salt water (including brines and seawater) and saturated salt water. The substantially fully hydrated depolymerized polymer in the treating fluid may be a depolymerized polysaccharide. In certain preferred embodiments, the substantially fully hydrated depolymerized polymer is a substantially fully hydrated depolymerized guar derivative polymer selected from the group consisting of hydroxypropylguar, carboxymethylhydroxypropylguar, carboxymethylguar, hydroxyethylguar and carboxymethylhydroxyethylguar. Of these, substantially fully hydrated depolymerized hydroxypropylguar is most preferred. Generally, the substantially fully hydrated depolymerized polymer is present in the treating fluid in an amount in the range of from about 0.2% to about 5% by weight of the water therein.

Examples of preferred crosslinking agents that may be utilized in the treating fluid include, but are not limited to, boron compounds such as, for example, boric acid, disodium octaborate tetrahydrate, sodium diborate and pentaborates, ulexite and colemanite, compounds that may supply zirconium IV ions such as, for example, zirconium lactate, zirconium lactate triethanolamine, zirconium carbonate, zirconium acetylacetonate and zirconium diisopropylamine lactate, compounds that can supply titanium IV ions such as, for example, titanium ammonium lactate, titanium triethanolamine, titanium acetylacetonate, aluminum compounds such as aluminum lactate or aluminum citrate or compounds that can supply antimony ions. In certain preferred embodiments, the crosslinking agent is a borate compound. The exact type and amount of crosslinking agent or agents used depends upon the specific depolymerized polymer to be crosslinked, formation temperature conditions and other factors know to those individuals skilled in the art. Generally, the crosslinking agent is present in the treating fluid in an amount in the range of from about 50 ppm to about 5000 ppm active crosslinker.

Optionally, a pH adjusting compound may be included in the treating fluid, inter alia, for adjusting the pH of the treating fluid to the optimum pH for crosslinking. The pH adjusting compound can be selected from sodium hydroxide, potassium hydroxide, lithium hydroxide fumaric acid, formic acid, acetic acid, hydrochloric acid, acetic anhydride and the like. In certain preferred embodiments, the pH adjusting compound is sodium hydroxide. When used, the pH adjusting compound is generally present in the treating fluid in an amount in the range of from about 0% to about 0.3% by weight of the water in the treating fluid.

When a borate crosslinking agent is used, the pH adjusting compound may be used to elevate the pH of the treating fluid to above about 9. At that pH, the borate compound crosslinking agent crosslinks the short chain hydrated polymer segments. When the pH of the crosslinked treating fluid falls below about 9, the crosslinked sites are no longer crosslinked. Thus, when the crosslinked fracturing fluid of this invention contacts the subterranean formation being treated, the pH is lowered to some degree, which begins the breaking process. In order to cause the fracturing fluid to completely revert to a thin fluid in a short period of time, a delayed delinker capable of lowering the pH of the treating fluid may be included in the treating fluid. Examples of delayed delinkers that may be utilized include, but are not limited to, various lactones, esters, encapsulated acids and slowly soluble acid generating compounds, oxidizers which produce acids upon reaction with water, water reactive metals such as aluminum, lithium and magnesium and the like. In certain preferred embodiments, the delayed delinker is an ester. Where used, the delinker is generally present in the treating fluid in an amount in the range of from about 0% to about 1% by weight of the water therein. Alternatively, any of the conventionally used delayed breakers employed with metal ion crosslinkers may be used, for example, oxidizers such as sodium chlorite, sodium bromate, sodium persulfate, ammonium persulfate, encapsulated sodium persulfate, potassium persulfate, or ammonium persulfate and the like as well as magnesium peroxide. Enzyme breakers that may be employed include alpha and beta amylases, amyloglucosidase, invertase, maltase, cellulase and hemicellulase. The specific breaker or delinker used, whether or not it is encapsulated, as well as the amount thereof employed will depend upon the breaking time desired, the nature of the polymer and crosslinking agent, formation characteristics and conditions and other factors.

When the subterranean formation treating fluid of this invention is used in carrying out a fracture stimulation procedure, proppant material may be included in at least a portion of the treating fluid as it is pumped into the subterranean formation and into fractures created therein. The proppant material may be metered into the treating fluid as the treating fluid is formed and, as mentioned above, the quantity of proppant material per volume of treating fluid can be changed as required in real time. Examples of proppant material that may be used include, but are not limited to, sand, sintered bauxite, ceramic materials or glass beads. The proppant material used is generally present in the treating fluid in an amount in the range of from about 1 to about 24 pounds of proppant material per gallon of the treating fluid.

Additional components that may be included in the treating fluid of this invention and that may be a part of the treating fluid concentrate used to form the treating fluid include a buffer selected from the group consisting of sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate and the like. In certain preferred embodiments, the buffer is sodium carbonate. When used, the buffer is generally present in the treating fluid in an amount in the range of from about 0% to about 0.3% by weight of water therein.

The treating fluids as well as the concentrates of the present invention may also include a surfactant for preventing the formation of emulsions between the treating fluid and subterranean formation fluids contacted by the treating fluid. Examples of such surfactants include, but are not limited to, alkyl sulfonates, alkyl aryl sulfonates including alkyl benzyl sulfonates such as salts of dodecylbenzene sulfonic acid, alkyl trimethylammonium chloride, branched alkyl ethoxylated alcohols, phenol-formaldehyde anionic resin blends, cocobetaines, dioctyl sodium sulfosuccinate, imidazolines, alpha olefin sulfonates, linear alkyl ethoxylated alcohols, trialkyl benzylammonium chloride and the like. In certain preferred embodiments, the surfactant is a dodecylbenzene sulfonic acid salt. When used, the surfactant is generally present in the treating fluid in an amount in the range of from about 0% to about 0.1% by weight of the water therein.

The treating fluids and the concentrates of the present invention may also include a clay stabilizer such as potassium chloride, sodium chloride, ammonium chloride, tetramethyl ammonium chloride, or the like. In certain preferred embodiments, the clay stabilizer is potassium chloride or tetramethyl ammonium chloride. When used, the clay stabilizer is generally present in the treating fluid in an amount in the range of from about 0.5% to about 10% by weight of the water therein.

Other additives may be included in a subterranean formation treating fluid of this invention that are not normally in the treating fluid concentrate used to form the treating fluid. For example, in applications such as those where it is desirable to include a fluid loss control agent in the treating fluid, a fluid loss control agent may be metered into the blender during the mixing of the treating fluid. Examples of fluid loss control agents that may be used include, but are not limited to, silica flour, starches, waxes and resins. When used, the fluid loss control agent is generally present in the treating fluid in an amount in the range of from about 0% to about 1% by weight of water therein.

The treating fluids of the present invention may also include compounds for retarding the movement of the proppant introduced in the fluid within the created fracture. For example, materials in the form of fibers, flakes, ribbons, beads, shavings, platelets and the like comprised of glass, ceramics, carbon composite, natural or synthetic polymers or metals and the like may be admixed with the fluid and proppant introduced into the subterranean formation to retard or prevent the movement of the introduced proppant. A more detailed description of the forgoing materials is disclosed in, for example, U.S. Pat. Nos. 5,330,005; 5,439,055; and 5,501,275, the relevant disclosures of which are incorporated herein by reference. Alternatively, or in addition to the prior materials, a material comprising a tackifying compound may be admixed with the fluid or the proppant to coat at least a portion of the proppant or other solid materials identified above such that the coated material and particulate adjacent thereto will adhere together to form agglomerates which will bridge in the created fracture to prevent particulate flowback. The tackifying compound also may be introduced into the formation with the treatment fluid prior to or after the introduction of the proppant into the formation. The coated material may be effective in inhibiting the flowback of fine particulate within the proppant pack having a size ranging from about that of the proppant to less than about 600 mesh. The coated proppant or other material may also be effective in, inter alia, consolidating fine particulates in the formation in the form of agglomerates in order to, inter alia, prevent the movement of the fines during production of the formation fluids from the well bore subsequent to the treatment. A more detailed description of the use of the foregoing tackifying compound and the methods of use thereof is disclosed in U.S. Pat. Nos. 5,775,415; 5,787,986; 5,833,000; 5,839,510; 5,871,049; 5,853,048; and 6,047,772, the relevant disclosures of which are incorporated herein by reference thereto.

Additional additives that may be included in the treating fluids of this invention include, but are not limited to, scale inhibitors, demulsifiers, clay stabilizers, bactericides, breaker activators and the like.

The water used to prepare the treating fluids of the present invention may be fresh water, unsaturated salt water including brines and seawater and saturated salt water. The substantially fully hydrated depolymerized polymer can be a substantially fully hydrated depolymerized polysaccharide and is preferably a substantially fully hydrated depolymerized guar derivative polymer selected from the group consisting of hydroxypropylguar, carboxymethylhydroxypropylguar, carboxymethylguar, hydroxyethyl cellulose, grafted hydroxyethyl cellulose, carboxymethyl cellulose, carboxymethylhydroxyethyl cellulose and the like. In certain preferred embodiments, the substantially fully hydrated depolymerized polymer is depolymerized hydroxypropylguar. The substantially fully hydrated depolymerized polymer may be included in the treating fluid or fracturing fluid in an amount in the range of from about 0.2% to about 5% by weight of the water therein.

The crosslinking agent used in the treating fluids and fracturing fluids of the present invention is preferably selected from the group consisting of boron compounds such as, for example, boric acid, disodium octaborate tetrahydrate, sodium diborate and pentaborates, compounds that may supply zirconium IV ions such as, for example, zirconium lactate, zirconium lactate triethanolamine, zirconium carbonate, zirconium acetylacetonate and zirconium diisopropylamine lactate, compounds that can supply titanium IV ions such as, for example, titanium ammonium lactate, titanium triethanolamine, titanium acetylacetonate, aluminum compounds such as aluminum lactate or aluminum citrate or compounds that supply antimony ions. Of these, a borate compound is the most preferred. The crosslinking agent utilized is generally present in the treating fluid in an amount in the range of from about 50 ppm to about 5000 ppm active crosslinker.

The treating fluids and fracturing fluids of the present invention also include a proppant material that may be resin coated or uncoated sand, sintered bauxite, ceramic materials, glass beads and the like. The proppant material is included in the treating fluids and fracturing fluids of the present invention in an amount in the range of from about 1 to about 24 pounds of proppant material per gallon of the treating fluids or fracturing fluids.

The treating fluids and fracturing fluids may also include a pH adjusting compound for elevating the pH of the fluid. The pH adjusting compound can be selected from sodium hydroxide, potassium hydroxide, lithium hydroxide, formic acid, fumaric acid, acetic acid, acetic anhydride, hydrochloric acid and the like. Of these, sodium hydroxide is preferred. Where used, the pH adjusting compound is generally present in the treating fluids and fracturing fluids in an amount in the range of from about 0% to about 0.3% by weight of the water in the treating fluids or fracturing fluids.

The treating fluids and fracturing fluids may also include a buffer selected from the group consisting of sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate and the like. Of these, sodium carbonate is preferred. Where used, the buffer is generally present in the treating fluids and fracturing fluids in an amount in the range of from about 0% to about 0.3% by weight of water therein.

Another component that may be included in the treating fluids and fracturing fluids is a surfactant, inter alia, to prevent the formation of emulsions between the treating or fracturing fluids and subterranean formation fluids. Examples of surfactants that may be used include, but are not limited to, alkyl sulfonates, alkyl aryl sulfonates including alkyl benzyl sulfonates such as salts of dodecylbenzene sulfonic acid, alkyl trimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols, trialkyl benzylammonium chloride and the like. Of these, salts of dodecylbenzene sulfonic acids are preferred. Where used, the surfactant may be included in the treating fluids and fracturing fluids in an amount in the range of from about 0% to about 0.1% by weight of water therein.

Yet another component that may be included in the treating fluids and fracturing fluids is a clay stabilizer. Examples of clay stabilizers include, but are not limited to, potassium chloride, sodium chloride, ammonium chloride and tetramethyl ammonium chloride and the like. Of these, potassium chloride and tetramethyl ammonium chloride are preferred. When used, the clay stabilizer is generally present in the treating fluids and fracturing fluids in an amount in the range of from about 0.5% to about 10% by weight of the water therein.

Still another component that can be included in the treating fluids and fracturing fluids is a fluid loss control agent such as, for example, silica flour, starches, waxes and resins. Where used, the fluid loss control agent may be included in the treating fluids and fracturing fluids in an amount in the range of from about 0% to about 1% by weight of water therein.

Another component which may be included in the treating fluids and fracturing fluids is a breaker or crosslink delinker for causing the treating and fracturing fluids to quickly revert to a thin fluid. Examples of suitable breakers or delinkers include, but are not limited to, a delayed breaker or delinker capable of lowering the pH of the treating fluids and fracturing fluids to cause the polymer crosslink to reverse. Examples of delayed breakers or delinkers that may be utilized include, but are not limited to, various lactones, esters, encapsulated acids and slowly soluble acid generating compounds, oxidizers which produce acids upon reaction with water, water reactive metals such as aluminum, lithium and magnesium and the like. Of these, the esters are preferred. Alternatively, any of the conventionally used breakers employed with metal ion crosslinkers can be utilized such as, for example, sodium chlorite, sodium bromate, sodium persulfate, ammonium persulfate, encapsulated sodium persulfate, potassium persulfate, or ammonium persulfate and the like as well as magnesium peroxide. Enzyme breakers that may be employed include alpha and beta amylases, amyloglucosidase, invertase, maltase, cellulase and hemicellulase is preferred. Where used, the breaker or delinker may be included in the treating fluids and fracturing fluids in an amount in the range of from about 0% to about 1% by weight of water therein.

The subterranean formation treatment fluids of the present invention also may include substantially any of the conventionally known foaming agents that do not adversely react with the fluid constituents such that a gaseous compound such as nitrogen, air, carbon dioxide or another gasifying compound can be admixed with the fluid to form a foam for introduction into the subterranean formation. The gaseous compound may be admixed with the fluid in an amount in the range of from 5% to about 90% to form a foamed treatment fluid for use in stimulating a subterranean formation. When foamed, the fluid of the present invention provides the same benefits as are found in the use of other foamed treatment fluids. Among other benefits, the foamed fluid results in less polymer being introduced into the formation, may provide improved fluid loss control and may provide a gas assist in removing the treatment fluid from the well bore at the conclusion of the treatment.

In certain preferred embodiments, the treating fluids and fracturing fluids of the present invention may be used in combination with other fluids, such as a low viscosity fluid, in fracturing a subterranean formation. While such combination fracturing fluid operations may be suitable for a variety of fracturing applications, they may be particularly suitable for fracturing subterranean formations comprising shale, coal, or other low permeability reservoirs, including those where hydrocarbons are produced through natural fractures, or butts and cleats. In such combination fluid fracturing operations, the operation may be initiated by first introducing a volume of a first treating and fracturing fluid of the present invention in a subterranean formation at or near a zone of interest, to create or enhance at least one fracture therein. As referred to herein, the term "zone of interest" will be understood to mean a selected portion of the subterranean formation where a fracture is to be created or enhanced. As referred to herein, the phrase "introducing the first treating and fracturing fluid into a subterranean formation at or near a zone of interest" will be understood to mean that the first treating fluid is substantially the first fluid to enter the zone of interest during the fracturing operation, i.e., that another fluid (other than the first treating fluid) is not permitted to substantially enter the zone of interest before the first treating fluid. The first treating fluid may be introduced at or near a zone of interest in a variety of ways. For example, the first treating fluid may be introduced at or near a zone of interest by, inter alia, swabbing the well bore dry before introducing the first treating fluid into the zone of interest in the subterranean formation. Or, for example, the first treating fluid may be introduced at or near a zone of interest by, inter alia, circulating the first treating fluid through tubing within the well bore (and thus displacing any pre-existing well fluid upwards and out of the well bore) until the first treating fluid reaches a depth at or near the zone of interest, and then introducing the first treating fluid into the subterranean formation. Or, for example where the subterranean formation comprises a set of perforations, the first treating fluid may be introduced at or near a zone of interest by, inter alia, circulating the first treating fluid through tubing within the well bore (and thus displacing any pre-existing well bore fluid upwards and out of the wellbore) until the first treating fluid reaches a depth at or near the perforations, and then introducing the first treating fluid into the subterranean formation. In a preferred embodiment where the first treating fluid is introduced at or near a zone of interest by circulating through tubing, the tubing may be raised up above the zone of interest once the first treating fluid has reached a depth at or near the zone of interest, but before the first treating fluid is introduced into the subterranean formation; inter alia, this may prevent the tubing from damaging the zone of interest and may also prevent a particulate such as proppant from bridging behind the tubing. Among other benefits, introducing the first treating fluid into the subterranean formation at or near a zone of interest may, inter alia, minimize the dilation of natural fractures within the subterranean formation near the well bore until after one or a few dominant fractures have been created within the subterranean formation.

In certain embodiments, the first treating fluid used in the combination fluid fracturing operations described herein will have a volume in the range of at least about 1,000 gallons. In certain embodiments, the first treating fluid may further comprise a particulate fluid loss additive, such as calcium carbonate, or a proppant, such as 100 mesh sand. Among other benefits, the inclusion of a particulate in the first treating fluid may, inter alia, minimize the dilation of natural fractures within the subterranean formation near the well bore until after one or a few dominant fractures have been created within the subterranean formation. Among other benefits, the inclusion of a particulate in the first treating fluid may also, inter alia, reduce fluid loss to natural fractures, inter alia, by bridging the natural fractures off from the one or a few dominant fractures. Among other benefits, the viscous nature of the treating and fracturing fluids of the present invention may better enable the creation of one or a few dominant fractures in the formation.

After initiating the combination fluid fracturing operation with this first treating and fracturing fluid of the present invention so as to create a dominant fracture, a second treating fluid comprising a low viscosity fluid may then be introduced to the subterranean formation so as to extend the dominant fracture further from the well bore. In certain preferred embodiments, the second treating fluid comprises water, or water in combination with a friction reducer. Any compound which enhances the laminar flow characteristics of the second treating fluid may be a suitable friction reducer. An example of a suitable friction reducer is commercially available under the tradename "FR 26L" from Halliburton Energy Services, Inc., at various locations. Optionally, the second treating fluid may further comprise a proppant. A wide variety of known proppants may be suitable for inclusion in the second treating fluid. Once of ordinary skill in the art, with the benefit of this disclosure, will recognize an appropriate type of proppant for a particular application. Where a proppant is included in the second treating fluid, the proppant may generally be present in an amount in the range of from about 0.1 to about 1.5 pounds of proppant per gallon of the second treating fluid. Optionally, in certain preferred embodiments, the second treating fluid may further comprise a surfactant, nitrogen, or a mixture thereof.

After the second treating fluid has been introduced to the subterranean formation, the combination fluid fracturing operations further comprise introducing a third treating fluid to the subterranean formation. This third treating fluid is a treating and fracturing fluid of the present invention. The third treating fluid further comprises a proppant. Any known proppant may be suitable for inclusion in the third treating fluid. One of ordinary skill in the art, with the benefit of this disclosure, will recognize the appropriate proppant for a particular application. Among other benefits, the inclusion of proppant in the third treating fluid desirably enhances the conductivity of the fracture. Among other benefits, a fracturing operation that combines placement of the treating and fracturing fluids of the present invention with placement of a low viscosity fluid may permit such fracturing operation to enhance the conductivity of a fracture while minimizing or preventing damage to the subterranean formation.

An improved method of this invention for treating a subterranean formation penetrated by a well bore is comprised of the following steps: (a) preparing a gelled and crosslinked treating fluid comprised of water, a substantially fully hydrated depolymerized polymer and a crosslinking agent for crosslinking the hydrated depolymerized polymer; and (b) contacting the subterranean formation with the gelled crosslinked treating fluid.

Another improved method of the present invention for treating a subterranean formation penetrated by a well bore whereby one or more fractures are formed therein is comprised of the following steps: (a) preparing a gelled and crosslinked fracturing fluid comprised of water, a substantially fully hydrated depolymerized polymer, a crosslinking agent for crosslinking the hydrated depolymerized polymer and a proppant material; and (b) contacting the subterranean formation with the gelled and crosslinked fracturing fluid under conditions effective to create at least one fracture in the subterranean formation.

Still another method of the present invention is a method of fracturing a subterranean formation comprising the steps of: introducing a first treating fluid into the subterranean formation at or near a zone of interest to create or enhance at least one fracture therein, the first treating fluid being a gelled and crosslinked treating fluid comprising water, a substantially fully hydrated depolymerized polymer and a crosslinking agent for crosslinking the substantially hydrated depolymerized polymer; introducing a second treating fluid into the subterranean formation such that a length of at least one fracture therein is extended, the second treating fluid having a lower viscosity than the first treating fluid; and introducing a third treating fluid into the subterranean formation, the third treating fluid being a gelled and crosslinked treating fluid comprising water, a substantially filly hydrated depolymerized polymer and a crosslinking agent for crosslinking the substantially hydrated depolymerized polymer, and further comprising a proppant material.

To facilitate a better understanding of the present invention, the following examples of some of the preferred embodiments are given. In no way should such examples be read to limit the scope of the invention.

EXAMPLE 1

The ability of the depolymerized polymer of the present invention to provide static fluid loss control to a treatment fluid introduced into a simulated subterranean formation and regained permeability subsequent to the treatment in comparison to conventional treatment fluids is determined in accordance with the following procedure. A synthetic core material comprising a ceramic having a 5 micron permeability is prepared in lengths of about 3.5 to 4 cm. The cores have a diameter of about 2.37 cm. The cores then are vacuum saturated in filtered API brine. Individual cores then are mounted in a Hassler sleeve device. The flow direction from left-to-right is designated as the production direction and from right-to-left is designated as the treatment direction to simulate the relative directions of movement in treating an actual subterranean formation. A hollow spacer is installed adjacent the core to act as a perforation cavity. Overburden pressure on the Hassler sleeve is administered by maintaining differential pressure from the treating pressure being used. The core is heated to and then maintained throughout the test at a temperature of 125° F. The core then is flushed with 25 ml of filtered API brine in the production direction. Initial permeability to API brine then is determined in the production direction by flow with a differential pressure of 20 psi. Rates are measured every 25 ml of throughput to determine the initial permeability. The fluid to be tested then is introduced into a reservoir in communication with the treatment direction flowlines. A high differential pressure of about 200 psi is placed across the core in the treatment direction as the treatment fluid is flowed into the core. The differential pressure is noted in the Table below for each test. The spurt loss fluid volume and all throughput volumes were collected over time intervals sufficient to determine the fluid loss. After the fluid loss phase of the test was completed, the return or regained permeability was measured by injecting 500 ml of API brine through the core in the production direction. No attempt is made to squeeze or chemically remove the filter cake created from the test fluid from the face of the core. The regained permeability then is determined from the flow data gathered. The regained permeability is set forth in Table I below. Each individual fluid which is tested is prepared from the polymers identified in the Table by hydration for a sufficient time to form a fully hydrated polymer and then a crosslinker comprising a borate source is admixed with the fluid in the amount indicated, if present.

TABLE I

Static Fluid Loss And Regained Permeability Tests

| Test Number | Polymer | Polymer Concentration, lbs./1000 gal. | pH | Crosslinker concentration, ppm | Fluid Loss Calc. Spurt | Cw | % Regained Permeability |
| --- | --- | --- | --- | --- | --- | --- | --- |
| 1 | guar | 41.6 | ND | 0 | 3.3 | 0.019 | 50.6 |
| 2 | guar | 41.6 | 8.4 | 115 | 0.163 | 0.007 | 79.6 |
| 3 | hydroxypropylguar | 41.6 | 8.2 | 315 | 0.662 | 0.012 | 86.9 |
| 4 | hydroxypropylguar | 41.6 | 8.4 | 315 | 0.045 | 0.002 | 89.8 |
| 5 | depolymerized HPG | 41.6 | 9 | 105 | 0.232 | 0.008 | 92.95 |
| 6 | depolymerized HPG | 41.6 | 9 | 315 | 0.048 | 0.007 | 96.3 |

ND: no determination

The foregoing data clearly illustrate that for similar fluid loss, in comparison to conventional treatment fluids, the use of the depolymerized polymer of the present invention results in improved regained formation permeability.

EXAMPLE 2

To evaluate the performance of the various fluids, dynamic fluid loss tests are performed using the depolymerized polymer of the present invention in comparison to conventional treatment fluids in accordance with the following procedure. Core samples are prepared to fit into a modified API linear flow cell. Each sample has a surface area of 10 square inches. Two core wafers are set apart by a 0.30 inch gap to allow fluid to flow through the cell for the dynamic test conditions. The test fluid then is prepared including the addition of any crosslinker. The test fluid is pumped through 340 ft of 0.194 inch diameter steel tubing to provide preconditioning and a shear history to the test fluid. The shear rate on the fluid is about 1800 sec−1. The fluid then is introduced into a section of 0.62 inch diameter tubing immersed in a heating bath to simulate the lower shear rate of a fluid in a fracture. The shear rate is about 50 sec−1. The fluid is heated to a test temperature of about 180° F. as it goes through the tubing. The test fluid then is introduced into the flow cell where the dynamic fluid loss occurs. A 1000 psi differential pressure force is used to drive the fluid through the cores. The test then is continued for 60 minutes to permit determination of fluid loss coefficients based upon collected fluid volumes. The results are set forth in Table II below. The test fluids comprised for sample 1, a concentration of 129 gallons of treating fluid concentrate of depolymerized polymer and tap water containing 2% KCl per 1000 gallons of fluid which was crosslinked with a borate source at a pH of about 10.1. For sample 2, the fluid comprised guar hydrated in tap water with 2 gallons per 1000 gallons of fluid of a 50% tetramethyl ammonium chloride solution and a breaker comprising 0.25 pounds sodium persulfate and 0.25 pounds encapsulated sodium persulfate per 1000 gallons of fluid which was crosslinked with a borate source at a pH of above about 9.5. For sample 3, the fluid comprised guar hydrated in tap water with 2 gallons per 1000 gallons of fluid of a 50% tetramethyl ammonium chloride solution and a breaker comprising 15 gallons per 1000 gallons of fluid of a sodium chlorite solution and 3 gallons per 1000 gallons of fluid of a copper ethylenediaminetetraacetic acid solution which was crosslinked with a borate source at a pH of above about 9.5.

TABLE II

Dynamic Fluid Loss Coefficients With Ohio Sandstone Core Wafers (0.1 to 0.3 md)

| Sample | Polymer | Polymer Concentration % by wt | Breaker | $C_w$ ($ft/min^{0.5}$) | Spurt ($gal/ft.^2$) |
|---|---|---|---|---|---|
| 1 | depolymerized HPG | 1.49 | None | 0.001877 | 0.00294 |
| 2 | guar | 0.3 | persulfate | 0.00287 | 0 |
| 3 | guar | 0.3 | activated sodium chlorite | 0.00357 | 0.0027 |

The results illustrate the present invention provides a treatment fluid with a lower dynamic fluid loss than conventional treatment fluids.

EXAMPLE 3

To determine the fracture conductivity of a proppant pack, the following test was used to simulate production through a proppant pack to determine the conductivity of the fracture. The test cell from each test in Example 2 is opened and the space between the two core wafers is filled with a 20/40 mesh Ottawa sand proppant at a specified lb/ft² concentration. The test cell then is closed and placed in a press where closure stress can be applied and the reservoir temperature can be simulated by heating the cell to 180° F. The conductivity of the proppant pack then is measured over a period of at least 48 hours until a stable value is obtained by flowing water through the core and proppant pack within the test cell. The results of the tests are set forth in Table III below. The samples are compared to a baseline determination of conductivity determined by placing proppant between the two core wafers with the designated proppant concentration without any fracturing fluid having been passed through the core.

TABLE III

Proppant Pack Conductivity Values

| Sample | Proppant Concentration, lb/ft² | Closure Stress, psi | Conductivity, md-ft | Percentage of Baseline, % |
|---|---|---|---|---|
| 1 | 2 | 2000 | 2744 | 65 |
|   |   | 4000 | 1705 | 74 |
|   |   | 6000 | 540 | 62 |
| 2 | 2 | 2000 | 674 | 16 |
|   |   | 4000 | 390 | 17 |
|   |   | 6000 | 209 | 24 |
| 3 | 2 | 2000 | 2526 | 60 |
|   |   | 4000 | 1011 | 44 |
|   |   | 6000 | 488 | 56 |

The results illustrate the treatment fluid of the present invention achieves superior proppant pack conductivity in comparison to conventional treatment fluids without the necessity of the use of any breaker in the treatment fluid.

EXAMPLE 4

To evaluate the performance of the treatment fluid of the present invention in an actual field job, two wells were treated in accordance with the methods of the present invention. The wells in the Cottage Grove formation each had a depth of about 8000 ft and a bottom hole temperature of about 155° F. One treatment was performed with an added breaker in the treatment fluid and the other treatment was performed without any additional breaker. In the first job, 125 barrels of treatment fluid concentrate were prepared with a depolymerized hydroxypropylguar which was utilized to prepare 3000 gallons of linear gel that was used to perform a minifrac treatment on the well and 30,000 gallons of crosslinked fluid which was used to perform the principal treatment and place the proppant. The fluid included sodium hydroxide in an amount sufficient to raise the fluid pH to about 12.1 and a borate crosslinker for crosslinking the depolymerized polymer. The proppant was ramped from a concentration of from about 1 to about 5 lbs per gallon for a total injected quantity of 50,000 pounds. A conventional breaker comprising encapsulated ammonium persulfate was admixed with the crosslinked gelled fluid in an amount of from about 2 to about 4 lbs per 1000 gallons of fluid. The treatment was performed at an average rate of about 13 bpm and successfully placed the entire quantity of proppant.

Production of oil during the two months following the treatment exceeded per-treatment production by in excess of 200%.

The second job utilized the same depolymerized polymer. Approximately 110 barrels of treatment fluid concentrate were used to prepare 30,000 gallons of crosslinked fluid that is used to perform a fracturing treatment upon the well. The fluid includes sodium hydroxide in an amount sufficient to adjust the pH to a level of about 12.1 and a borate crosslinker for crosslinking the depolymerized polymer. The proppant introduced with the fluid was ramped in concentration from about 1 to about 5 lbs per gallon of fluid. The fluid did not include any breaker.

Production of oil during the two months after the treatment exceeded pre-treatment production by in excess of 100%.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. A method of fracturing a subterranean formation comprising the steps of:
   introducing a first treating fluid into the formation at or near a zone of interest within the formation, to create or enhance at least one fracture therein, the first treating fluid being a gelled and crosslinked treating fluid comprising water, a substantially fully hydrated depolymerized polymer and a crosslinking agent for crosslinking the substantially hydrated depolymerized polymer;
   introducing a second treating fluid into the formation such that a length of at least one fracture therein is extended, the second treating fluid having a lower viscosity than the first treating fluid; and introducing a third treating fluid into the formation, the third treating fluid being a gelled and crosslinked treating fluid comprising water, a substantially fully hydrated depolymerized polymer and a crosslinking agent for crosslinking the substantially hydrated depolymerized polymer and further comprising a proppant material.

2. The method of claim 1 wherein the subterranean formation comprises a well bore, and wherein the step of introducing a first treating fluid into the formation at or near a zone of interest comprises the step of swabbing the well bore dry before introducing the first treating fluid into the zone of interest.

3. The method of claim 1 wherein the subterranean formation comprises a well bore and tubing, and wherein the step of introducing a first treating fluid into the formation at or near a zone of interest comprises the step of circulating the first treating fluid through the tubing until the first treating fluid reaches a depth at or near the zone of interest.

4. The method of claim 3 wherein the well bore comprises a well fluid, and wherein the step of circulating the first treating fluid through the tubing until the first treating fluid reaches a depth at or near the zone of interest substantially displaces a portion of the well fluid out of the well bore.

5. The method of claim 1 wherein the subterranean formation comprises a set of perforations, and wherein the step of introducing a first treating fluid into the formation at or near a zone of interest comprises placing the first treating fluid at about or near the perforations in the subterranean formation.

6. The method of claim 1 wherein the step of introducing a third treating fluid into the formation enhances the conductivity of a fracture within the formation.

7. The method of claim 1 wherein the first treating fluid further comprises a proppant.

8. The method of claim 7 wherein the proppant comprises resin-coated or uncoated sand, sintered bauxite, ceramic materials, glass beads or a mixture thereof.

9. The method of claim 7 wherein the proppant comprises 100 mesh sand.

10. The method of claim 1 wherein the formation comprises natural fractures, and wherein the dilation of the natural fractures is minimized until after one dominant fracture has been established within the subterranean formation.

11. The method of claim 1 wherein the second treating fluid comprises water.

12. The method of claim 11 wherein the second treating fluid further comprises a proppant material, a friction reducer, nitrogen, or a mixture thereof.

13. The method of claim 1 wherein the proppant material comprises resin-coated or uncoated sand, sintered bauxite, ceramic materials, glass beads or a mixture thereof.

14. The method of claim 1 wherein the subterranean formation comprises shale, coal or a mixture thereof.

15. The method of claim 1 wherein the substantially fully hydrated depolymerized polymer is selected from the group consisting of hydroxypropylguar, carboxymethylhydroxypropylguar, carboxymethylguar, hydroxyethyl cellulose, grafted hydroxyethyl cellulose, carboxymethyl cellulose and carboxymethylhydroxyethyl cellulose.

16. The method of claim 1 wherein the substantially frilly hydrated depolymerized polymer comprises depolymerized hydroxypropylguar.

17. The method of claim 1 wherein the substantially fully hydrated depolymerized polymer is present in the first treating fluid in an amount in the range of from about 0.2% to about 5% by weight of the water therein.

18. The method of claim 1 wherein the substantially fully hydrated depolymerized polymer is present in the third treating fluid in an amount in the range of from about 0.2% to about 5% by weight of the water therein.

19. The method of claim 1 wherein the crosslinking agent is selected from the group consisting of boron compounds, compounds that supply zirconium IV ions, compounds that supply titanium IV ions, aluminum compounds and compounds that supply antimony ions.

20. The method of claim 19 wherein the crosslinking agent is a boron compound.

21. The method of claim 19 wherein the crosslinking agent is present in the first treating fluid in an amount in the range of from about 50 ppm to about 5000 ppm.

22. The method of claim 19 wherein the crosslinking agent is present in the third treating fluid in an amount in the range of from about 50 ppm to about 5000 ppm.

23. The method of claim 1 wherein the first treating fluid further comprises a pH adjusting compound, a buffer, a tackifying compound, a surfactant, a clay stabilizer, a fluid loss control agent, a delayed delinker, a delayed breaker, or a mixture thereof.

24. The method of claim 1 wherein the third treating fluid further comprises a pH adjusting compound, a buffer, a tackifying compound, a surfactant, a clay stabilizer, a fluid loss control agent, a delayed delinker, a delayed breaker, or a mixture thereof.

25. The method of claim 1 wherein the substantially fully hydrated depolymerized polymer has a polydispersity ratio of from about 1 to about 12.

26. The method of claim 1 wherein the proppant material is present in the third treating fluid in an amount in the range of from about 1 to about 24 pounds of proppant material per gallon of the third treating fluid.

27. The method of claim 12 wherein the proppant material is present in the second treating fluid in an amount in the range of from about 0.1 to about 1.5 pounds of proppant material per gallon of the second treating fluid.

28. A method of fracturing a subterranean formation comprising the steps of:
introducing a first treating fluid into the subterranean formation at or near a zone of interest to create or enhance at least one fracture therein, the first treating fluid being a gelled and crosslinked treating fluid comprising water, a substantially fully hydrated depolymerized polymer and a crosslinking agent for crosslinking the substantially hydrated depolymerized polymer;
introducing a second treating fluid into the subterranean formation such that a length of at least one fracture therein is extended, the second treating fluid having a lower viscosity than the first treating fluid; and
introducing a third treating fluid into the subterranean formation, the third treating fluid being a gelled and crosslinked treating fluid comprising water, a substantially fully hydrated depolymerized polymer and a crosslinking agent for crosslinking the substantially hydrated depolymerized polymer and further comprising a proppant material, wherein:
the second treating fluid comprises water; the subterranean formation comprises shale, coal or a mixture thereof; the crosslinking agent is a boron compound; the substantially fully hydrated depolymerized polymer is depolymerized hydroxypropylguar; the substantially fully hydrated depolymerized polymer is present in the first treating fluid in an amount in the range of from about 0.2% to about 5% by weight of the water therein; and the substantially fully hydrated depolymerized polymer is present in the third treating fluid in an amount in the range of from about 0.2% to about 5% by weight of the water therein.

29. The method of claim 28 wherein the subterranean formation comprises a well bore, and wherein the step of introducing a first treating fluid into the formation at or near a zone of interest comprises the step of swabbing the well bore dry before introducing the first treating fluid into the zone of interest.

30. The method of claim 28 wherein the subterranean formation comprises a well bore and tubing, and wherein the step of introducing a first treating fluid into the formation at or near a zone of interest comprises the step of circulating the first treating fluid through the tubing until the first treating fluid reaches a depth at or near the zone of interest.

31. The method of claim 30 wherein the well bore comprises a well fluid, and wherein the step of circulating the first treating fluid through the tubing until the first treating fluid reaches a depth at or near the zone of interest substantially displaces a portion of the well fluid out of the well bore.

32. The method of claim 28 wherein the subterranean formation comprises a set of perforations, and wherein the step of introducing a first treating fluid into the formation at or near a zone of interest comprises placing the first treating fluid at about or near the perforations in the subterranean formation.

33. The method of claim 28 wherein the first treating fluid comprises a proppant material.

34. The method of claim 28 wherein the second treating fluid further comprises a proppant material, a friction reducer, nitrogen, or a mixture thereof.

* * * * *